United States Patent [19]

Di Vittorio

[11] Patent Number: 5,152,629
[45] Date of Patent: Oct. 6, 1992

[54] TOOL HANDLE WEDGE

[76] Inventor: Ciro Di Vittorio, 46342 Raindance Rd., Fremont, Calif. 94539

[21] Appl. No.: 668,178

[22] Filed: Mar. 12, 1991

[51] Int. Cl.⁵ .............................................. B25G 3/00
[52] U.S. Cl. .................................... 403/248; 403/277
[58] Field of Search ............... 403/248, 249, 250, 251, 403/277

[56] References Cited

U.S. PATENT DOCUMENTS

| | | |
|---|---|---|
| 55,437 | 6/1866 | Wooding ............................ 403/248 |
| 241,647 | 5/1881 | Grellner . |
| 341,474 | 5/1886 | Grellner ............................ 403/249 |
| 477,082 | 6/1892 | Thompson et al. ................. 403/248 |
| 830,214 | 9/1906 | Denison et al. . |
| 964,976 | 7/1910 | Kukuruda ........................... 403/250 |
| 1,582,305 | 4/1926 | Reichling . |
| 1,924,015 | 8/1933 | Balth . |
| 2,467,284 | 4/1949 | Williams . |
| 2,884,970 | 5/1959 | Tarbox . |
| 3,639,013 | 2/1972 | Merrow . |
| 3,833,037 | 9/1974 | Fish . |
| 4,505,313 | 3/1985 | Finn .................................. 403/251 X |
| 4,669,342 | 6/1987 | Wilson . |
| 4,753,137 | 6/1988 | Kennedy . |

FOREIGN PATENT DOCUMENTS

| | | |
|---|---|---|
| 676394 | 7/1952 | United Kingdom ................ 403/248 |
| 1023759 | 3/1966 | United Kingdom . |

*Primary Examiner*—Andrew V. Kundrat
*Attorney, Agent, or Firm*—Oblon, Spivak, McClelland, Maier & Neustadt

[57] ABSTRACT

A tool handle wedge for providing a tight fit between a wooden handle and a tool head such a pick. In addition to a main wedge, wings are provided on each end of the wedge in a transverse direction. The wing wedges provide additional spreading of the handle to provide a tightening force in two directions. A screw may be inserted through the middle of the main wedge in order to tightly hold the wedge in place.

15 Claims, 2 Drawing Sheets

TOOL HANDLE WEDGE

BACKGROUND OF THE INVENTION

1. Field of the Invention

This invention relates generally to a wedge for holding a tool head on a tool handle and more specifically to a wedge for a tool handle having a simple wedge in one direction with wing wedges formed at each end thereof.

2. Discussion of the Background

Many common hand tools, especially impact tools or swing tools, are formed from a metal head mounted on a wooden handle, with the handle fitting into an eye of the head. A wedge is often driven into the handle in order to expand the handle end against the inside of the eye to firmly hold the head in place.

Such an arrangement can have many disadvantages. In some case, the handle is subject to breakage near the junction of the tool head. The action of the wedge may cause the handle to split or be otherwise weakened. The impact on the tool head as it is used often can cause such stress that the handle may be damaged. Especially in large tools, it is very difficult to keep the head firmly attached to the handle because of the large impact. This may create a dangerous situation where the head can fly off the handle causing injury to the user or bystanders. Additional difficulties may occur even if the head does not come off the handle since a loose connection of the head may cause an inefficient use of the tool and could cause injury to the user. An additional common problem is vibration through the handle. On a large tool especially, the impact through the head can create a lot of vibration in the handle. Wood is commonly used as the handle material since it helps to dampen the vibration. The vibration through the handle can be effected by the manner in which the head is mounted on the handle, and especially can be decreased by a good tight fit of the head on the handle.

In order to obtain a tight fit between the head and the handle, a number of different types of wedges have been developed U.S. Pat. No. 1,914,082 shows a sleeve which fits between a pick head and a handle. The sleeve is resilient and compressed slightly as the head is forced onto the handle. The sleeve may be formed in two pieces connected by a strip which protects the end of the handle.

U.S. Pat. No. 3,669,512 shows a carpenter's hammer which is held on a handle by means of a wedge. This wedge is formed in two directions. That is, the wedge forms a cross shape when viewed from the end of the handle. Thus, the spreading action of the wedge occurs in two perpendicular directions.

U.S. Pat. No. 1,518,259 also shows a carpenter's handle with a wedge in two directions. In this case, a long bolt extends through the handle of the hammer in order to hold the wedge in place. Unfortunately, the presence of such a metal object in the handle may badly effect the vibration damping facility of the wood handle.

German Patent 3041531 to Becker shows a handle connection for a hammer with a plate that fits on a ledge surrounding an eye near the upper surface of the head. A screw fits through a small opening in the plate and is screwed into the handle. However, in this system if the handle is short, some movement of the handle in the head occurs upon impact even if the plate is screwed tightly to the handle. Also, if the handle is too narrow because of shrinkage due to drying, for example, the handle may become loose and rattle. Such movements not only cause undesirable vibrations but also can shorten the life of the handle.

While these and similar devices help to hold tool heads on handles, they are subject to loosening and may undesirably effect the vibrational characteristics of the handle.

SUMMARY OF THE INVENTION

Accordingly, one object of this invention is to provide a novel tool handle wedge which firmly secures the tool head to the handle.

Another object of this invention is to provide a tool handle wedge which holds the tool head on the handle without undue effect of the vibrational damping characteristics of the handle.

Another object of this invention is to provide a tool handle wedge which fills the space between the handle and head when the handle is below standard size.

Briefly, these and other objects of the invention are achieved by providing a wedge with a compound shape for spreading the wood of the handle more effectively. The device includes a main body which is formed as a standard shaped wedge and has attached thereto a wing wedge on either end. Each wing wedge is designed to fit against the inside of the tool eye and extends perpendicularly from the end of the main body. A screw is provided at the center of the main body to firmly secure the wedge in position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
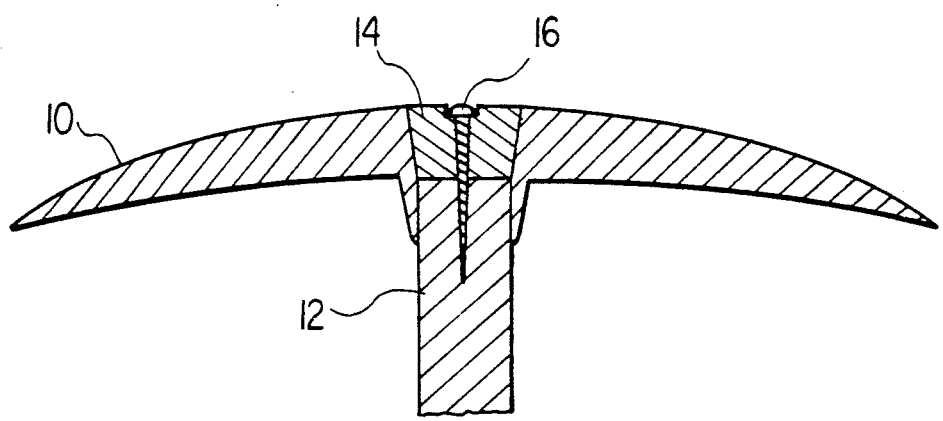
FIG. 1 is a transverse section of a pick utilizing the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows the present invention in use on a pick. The pick head 10 is mounted on wooden handle 12 as is well known. The present invention 14 is used as a wedge driven into the end of the handle to help hold the head on the handle. The end of the handle preferably has a kerf to receive the wedge in order to avoid the necessity of driving the wedge in with heavy hammer blows. Wood used as handles is so hard that a wedge can actually deform under impact if they are driven into the wood. The kerf allows the wedge to be made of soft iron or aluminum alloy, reducing its cost.

A screw 16 passes through the center of the wedge and is screwed into the handle in order to firmly hold the wedge in place. Preferably, the screw is a cap screw since more torque can be applied with a wrench than a screwdriver. The screw tip should extend below the eye of the tool head. Since the impact stress is concentrated in the center of eye, the screw transfers the stress from the end of the handle which is weaker, to the solid handle body below the eye, thus extending the life of the handle. If the tool handle shrinks during use, due to drying or other causes, the head can be made tight again by merely tightening the screw. Also, tightening the screw will pull the handle further up in the eye and push the wedge down into the handle to yield a secure connection.

Figure 2:
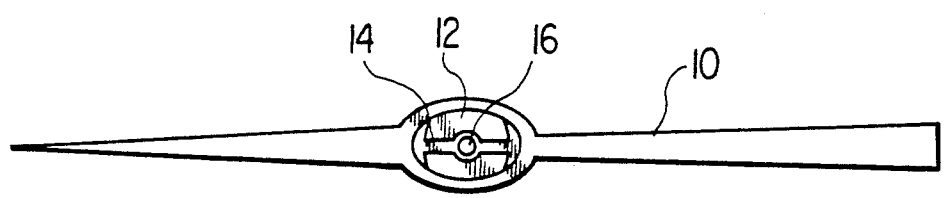
FIG. 2 is a top view of the pick shown in FIG. 1.

FIG. 2 shows the same pick using the invention, but looking down at the end of the handle. As can be seen, the wedge 14 is driven into the end of the wood handle and held in place by screw 16.

Figure 3:
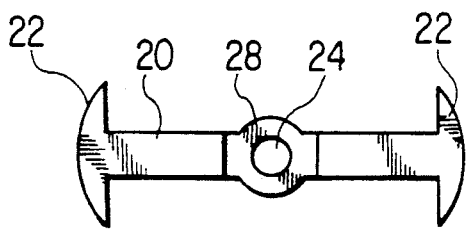
FIG. 3 is a top view of first embodiment of the present invention.
Figure 4:
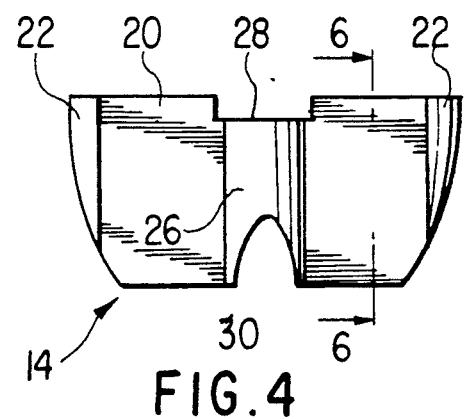
FIG. 4 is a side view of a first embodiment of the present invention.

As can be better seen in FIGS. 3 and following, the wedge 14 includes a main body 20 which forms the main dimension of the device. Attached at each end of the main body are wings 22 which extend transversely from the main body. In the center of the main body, a channel 24 is formed for receiving the screw 16. In order to provide sufficient thickness around this channel a rounded region 26 is formed in the middle of the main body. The main body forms a recessed portion 28 around the rounded region 26, as can better be seen in FIG. 4. The purpose of this recessed portion is to receive the head of the screw 16 so that it does not protrude beyond the end of the handle.

Figure 5:
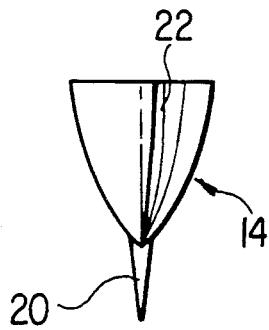
FIG. 5 is an end view of a first embodiment of the present invention.
Figure 6:
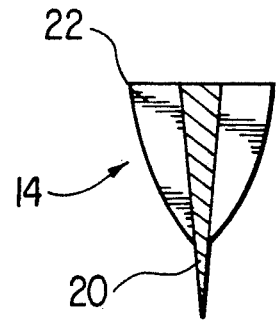
FIG. 6 is a cross sectional view of a first embodiment of the present invention.

FIG. 5 shows the shape of the wing 22 from the end of the device. The wing is in a generally triangular shape with the two sides being slightly curved. The wedge formed by the main body 20 extends beyond the end of the wing 22. FIG. 6 shows a cross sectional view of the same end along lines 6—6 of FIG. 4. This view shows that the main body 20 is formed in a wedge shape. The wing also tapers to a point and acts as a wedge in the direction perpendicular to the main direction.

Figure 7:
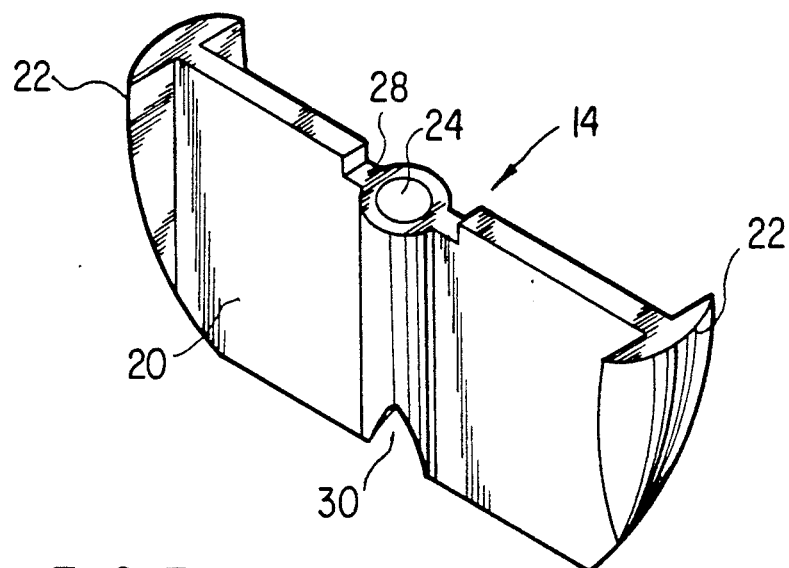
FIG. 7 is a perspective view of a first embodiment of the present invention.

FIG. 7 is a perspective view of the device. As is more apparent from this view, a notch 30 is formed in the wedge due to the presence of the channel 24 for receiving the screw.

In operation, the pick head or other tool head, is placed on the handle in the usual manner. The wedge is then driven or placed into the end of the handle through the eye of the tool. If a slot is preformed in the end of the handle, driving of the wedge may not be necessary. Screw 16 is then driven through channel 24 into the end of the handle. The screw should be of such a length as to firmly hold the wedge in place, but no longer than necessary since the presence of a central metal body will effect the vibration damping characteristics of the wood. As the wedge is driven into the handle, the wood is forced outwardly by the wedge in the central body and also inwardly by the wedge on each wing. Thus, the wood is forced in two directions at once which provides for a greater expansion and also a tighter grip on the tool head. Since the wings of the wedge are also in direct contact with the tool head, an even tighter grip is obtained.

Figure 8:
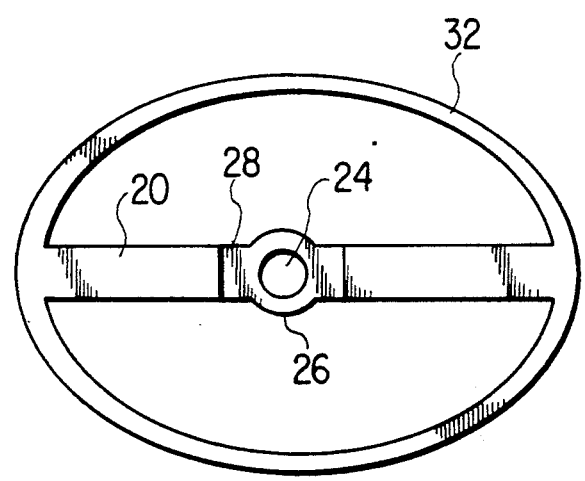
FIG. 8 is a top view of a second embodiment of the present invention.

While the above-described embodiment provides a tight connection between the tool head and handle in most situations, there are problems when the handles are undersized. That is, some manufacturers have poor quality control, especially in foreign countries, and the actual size of the handle is too small to give a tight fit. In these cases, even the above embodiment may not be sufficient to tighten the head to the handle. A second embodiment is now shown in FIG. 8 for these situations. The main body 20 and center channel 24 is formed in the same way as in the first embodiment, including the rounded region 26 and recessed portion 28. However, in place of wings 22, an entire elliptical section 32 is provided which generally matches the size and shape of the tool eye. The elliptical section is tapered to form a wedge in a vertical direction just as the wings did in the first embodiment. However, by forming a complete ring, the excess space will be filled up and provide a tight fit even for undersized handles. Thus, even a tighter fit can be accomplished using this embodiment.

It is also possible to provide other embodiments where the wings are greatly expanded to form half or more of an elliptical section, if desired. Thus, the wings can be expanded to any size depending on the looseness of the fit of the handle.

The present invention has been described in terms of a pick head. However, it is clear that other similar large tools or swinging impact tools such as sledge hammers, mattocks, mauls, axes and similar large tools could also utilize this device. In addition, small hand tools such as carpenter's hammers could also utilize this device.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A wedge device for holding a tool head, the tool head having an eye for receiving a tool handle, the eye having an inner surface, an opening width and a depth, comprising:
   a main body having a wedge shape and sized to extend across the opening width of the eye;
   at least one transverse wedge connected at one end of said main body and having an outer surface sized to press against part of the inner surface.

2. A wedge device according to claim 1, wherein said wedge device includes two transverse wedges, each connected on opposite ends of said main body.

3. A wedge device according to claim 2, wherein said transverse wedges are perpendicular to said main body.

4. A wedge device according to claim 1, further comprising a channel formed in said main body for receiving a screw to secure said wedge device to said tool handle.

5. A wedge device according to claim 4, further comprising a recessed portion in said main body for receiving a head of said screw.

6. A wedge device according to claim 1, wherein said transverse wedges are generally triangular in shape.

7. A wedge device according to claim 6, wherein said transverse wedge has a curved surface which matches a curve of an inner surface of an eye of said tool head.

8. A wedge device according to claim 1, wherein said wedge device is connected to said tool handle and secured thereto by a screw in order to firmly hold said tool head to said tool handle.

9. A wedge device according to claim 4, wherein said screw extends into said handle beyond a bottom of the eye of the tool head.

10. A wedge device for holding a tool head having an eye on a tool handle, comprising:
 a main body having a wedge shape; and
 a ring-shaped wedge being integrally connected to both ends of said main body and forming a curved shape therearound.

11. A wedge device according to claim 10, wherein an outer surface of said ring-shaped wedge matches the curve of an inner surface of an eye of said tool head.

12. A wedge device according to claim 10, further comprising a screw for securing said wedge device to said tool handle, wherein the screw extends into said handle beyond the bottom of an eye of the tool head.

13. A wedge device according to claim 10, wherein said wedge device is connected to said tool handle and secured thereto by a screw in order to firmly hold said tool head to said tool handle.

14. A wedge device according to claim 9, wherein said screw is longer than the depth of the tool head eye.

15. A wedge device according to claim 12, wherein said screw is longer than a depth of the tool head eye.

* * * * *